United States Patent
Choi et al.

(10) Patent No.: US 10,496,238 B2
(45) Date of Patent: Dec. 3, 2019

(54) 3D DISPLAY RAY PRINCIPLES AND METHODS, ZOOMING, AND REAL-TIME DEMONSTRATION

(71) Applicant: UNIVERSITY OF ROCHESTER, Rochester, NY (US)

(72) Inventors: Joseph S. Choi, Rochester, NY (US); John C. Howell, Rochester, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 0 days.

(21) Appl. No.: 15/682,679

(22) Filed: Aug. 22, 2017

(65) Prior Publication Data

US 2018/0052584 A1 Feb. 22, 2018

Related U.S. Application Data

(60) Provisional application No. 62/378,016, filed on Aug. 22, 2016.

(51) Int. Cl.
| | |
|---|---|
| *G06F 3/0481* | (2013.01) |
| *G06T 13/20* | (2011.01) |
| *G09G 3/00* | (2006.01) |
| *H04N 13/307* | (2018.01) |
| *H04N 5/232* | (2006.01) |
| *H04N 5/247* | (2006.01) |
| *G02B 27/22* | (2018.01) |
| *G06F 17/16* | (2006.01) |

(52) U.S. Cl.
CPC ..... *G06F 3/04815* (2013.01); *G02B 27/2214* (2013.01); *G06T 13/20* (2013.01); *G09G 3/003* (2013.01); *H04N 5/23293* (2013.01); *H04N 5/247* (2013.01); *H04N 13/307* (2018.05); *G06F 17/16* (2013.01); *H04N 5/23296* (2013.01)

(58) Field of Classification Search
None
See application file for complete search history.

(56) References Cited

U.S. PATENT DOCUMENTS

| | | |
|---|---|---|
| 4,288,148 A | 9/1981 | Offner |
| 4,870,485 A | 9/1989 | Toresu et al. |
| 4,881,068 A | 11/1989 | Korevaar et al. |
| 5,214,419 A | 5/1993 | Demond et al. |
| 5,220,631 A | 6/1993 | Grippin |
| 5,231,538 A | 7/1993 | Anderson et al. |
| 5,307,162 A | 4/1994 | Schowengerdt |

(Continued)

FOREIGN PATENT DOCUMENTS

| | | |
|---|---|---|
| CA | 2984758 | 11/2016 |
| CA | 2998659 | 3/2017 |

(Continued)

OTHER PUBLICATIONS

EP16787951.9 Office Action dated Dec. 6, 2018, 4 pages.
(Continued)

*Primary Examiner* — David H Chu
(74) *Attorney, Agent, or Firm* — Kilpatrick Townsend & Stockton LLP

(57) ABSTRACT

The present disclosure is generally related to three-dimensional displays and methods for displaying three-dimensional images. Some embodiments may be related to zooming for 3D image capture and display in real-time.

10 Claims, 5 Drawing Sheets

(56) References Cited

U.S. PATENT DOCUMENTS

| | | | |
|---|---|---|---|
| 5,627,554 A | 5/1997 | Jefferson | |
| 5,684,621 A | 11/1997 | Downing | |
| 5,745,197 A | 4/1998 | Leung et al. | |
| 5,914,807 A | 6/1999 | Downing | |
| 5,936,767 A | 8/1999 | Favalora | |
| 5,943,160 A | 8/1999 | Downing | |
| 5,956,172 A | 9/1999 | Downing | |
| 6,466,184 B1 | 10/2002 | Whitesell et al. | |
| 6,501,590 B2 | 12/2002 | Bass et al. | |
| 7,425,951 B2* | 9/2008 | Fukushima | H04N 13/31 345/419 |
| 7,446,733 B1* | 11/2008 | Hirimai | G02B 3/005 345/32 |
| 7,537,345 B2 | 5/2009 | Refai et al. | |
| 7,858,913 B2 | 12/2010 | Refai et al. | |
| 8,075,139 B2 | 12/2011 | Refai et al. | |
| 8,247,755 B2 | 8/2012 | Refai et al. | |
| 8,638,498 B2* | 1/2014 | Bohn | G02B 27/2242 359/412 |
| 8,658,988 B2 | 2/2014 | Betsui | |
| 9,557,547 B2 | 1/2017 | Choi et al. | |
| 9,706,186 B2* | 7/2017 | Shibazaki | H04N 5/225 |
| 9,798,153 B2* | 10/2017 | Ide | G02B 3/0056 |
| 9,807,377 B2* | 10/2017 | Hiddink | G02B 27/2242 |
| 2002/0117605 A1 | 8/2002 | Alden | |
| 2003/0227415 A1 | 12/2003 | Joannopoulos et al. | |
| 2006/0171032 A1 | 8/2006 | Nishioka | |
| 2006/0192869 A1 | 8/2006 | Yoshino et al. | |
| 2009/0051699 A1 | 2/2009 | Posa et al. | |
| 2009/0128034 A1 | 5/2009 | Ku | |
| 2009/0310231 A1* | 12/2009 | Maekawa | G02B 1/007 359/733 |
| 2009/0316279 A1 | 12/2009 | Bowers et al. | |
| 2010/0066730 A1 | 3/2010 | Grossman | |
| 2010/0265552 A1 | 10/2010 | Wang et al. | |
| 2011/0001429 A1 | 1/2011 | Davis | |
| 2012/0268836 A1 | 10/2012 | Mercado | |
| 2013/0341508 A1 | 12/2013 | Betsui | |
| 2014/0111479 A1 | 4/2014 | Krah et al. | |
| 2015/0365642 A1* | 12/2015 | Kline | H04N 5/23293 348/143 |
| 2016/0025956 A1 | 1/2016 | Choi et al. | |
| 2018/0267326 A1 | 9/2018 | Broadbent et al. | |
| 2018/0292179 A1 | 10/2018 | Choi et al. | |
| 2019/0141315 A1 | 5/2019 | Broadbent et al. | |

FOREIGN PATENT DOCUMENTS

| | | |
|---|---|---|
| EP | 901212 | 3/1999 |
| EP | 2876879 | 5/2016 |
| EP | 3286596 | 2/2018 |
| EP | 3292436 | 3/2018 |
| EP | 3353593 | 8/2018 |
| EP | 3494457 | 6/2019 |
| JP | 61269518 | 11/1986 |
| JP | 2001358567 | 12/2001 |
| JP | 2018537701 | 8/2002 |
| JP | 2018524639 | 8/2018 |
| JP | 2018524952 | 8/2018 |
| WO | 02067196 | 8/2002 |
| WO | 03030099 | 4/2003 |
| WO | 2014024121 | 2/2014 |
| WO | 2016179158 A2 | 11/2016 |
| WO | 2016179158 A3 | 11/2016 |
| WO | 2017007526 A2 | 1/2017 |
| WO | 2017007526 A3 | 1/2017 |
| WO | 2017053336 | 3/2017 |
| WO | 2018027110 | 2/2018 |
| WO | 2018057902 | 3/2018 |

OTHER PUBLICATIONS

PCT/US2017/052972, "International Preliminary Report on Patentability", dated Apr. 4, 2019, 12 pages.

Winscape, http://www.rationalcraft.com/Winscape.html, Apr. 18, 2010 (downloaded from Internet Archive Wayback Machine on Aug. 1, 2018), all pages.

U.S. Appl. No. 14/714,671, Non-Final Office Action, dated May 23, 2016, 11 pages.

U.S. Appl. No. 14/714,671, Notice of Allowance, dated Sep. 28, 2016, 7 pages.

Cai, et al., "Optical cloaking with metamaterials", Nature Photonics, vol. 1, Apr. 2007, p. 224-227.

Chanda et al., "Large-area flexible 3D optical negative index metamaterial formed by nanotransfer printing," Nature Nanotechnology, vol. 6, Jul. 2011, pp. 402-407.

Chen, et al., "Ray-optics cloaking devices for large objects in incoherent natural light" Nature Communications, vol. 4, Oct. 24, 2013, p. 2652 (6 pages).

Chen, et al., "Transformation optics and metamaterials", Nature Materials, vol. 9, May 2010, p. 387-396.

Chen, et al., "Macroscopic invisibility cloaking of visible light" Nature Communications, vol. 2, Feb. 1, 2011, pp. 176 (6 pages).

Chen et al., "Extending the bandwidth of electromagnetic cloaks," Physical Review B 76, 2007, pp. 241104-1-241104-4.

Choi et al., "Paraxial ray optics cloaking," Optics Express, vol. 22, 2014, pp. 29465-29478.

Choi et al., "Digital integral cloaking", Optica, vol. 3, No. 5, May 2016, pp. 536-540.

Choi et al., "Paraxial full-field cloaking", Optics Express, vol. 23, 2015, pp. 15857-15862.

Clark et al., "1990 International Lens Design Conference lens design problems: the design of a NonLens", SPIE, vol. 1354, 1990, pp. 555-569.

Collins, "Lens-System Diffraction Integral Written in Terms of Matrix Optics," J. Opt. Soc. Am. vol. 60, No. 9, Sep. 1970, pp. 1168-1177.

Costa et al., "Achromatic lens based on a nanowire material with anomalous dispersion," Optics Express, vol. 20, No. 13, Jun. 2012, pp. 13915-13922.

Devaney, "Nonuniqueness in the inverse scattering problem", J. Math. Phys., vol. 19, No. 7, 1978, pp. 1526-1531.

Duan et al., "Geometric optics-based multiband cloaking of large objects with the wave phase and amplitude preservation," Optics Express, vol. 22, No. 22, 2014, pp. 27193-27202.

Ergin et al. "Three-Dimensional invisibility Cloak at Optical Wavelengths," Science, vol. 328, Apr. 2010, pp. 337-339.

Fleury et al., "Cloaking and Invisibility: A Review," Progress in Eledromagnetics Research, vol. 147, 2014, pp. 171-202.

Fleury et al., "Invisibility and Cloaking: Origins, Present, and Future Perspectives," Physical Review Applied, vol. 4, 2015, pp. 037001-1-037001-2.

Fridman, "Demonstration of temporal cloaking", Nature, vol. 481, Jan. 2012, pp. 62-65.

Gabrielli, et al., "Silicon nanostructure cloak operating at optical frequencies", Nature Photonics, Jul. 2009, 3 pages.

Gbur, "Invisibility Physics: Past, Present, and Future", Progress in Optics, vol. 58, 2013, pp. 65-114.

Geng, "Three-dimensional display technologies", Advances in Optics and Photonics, vol. 5, 2013, pp. 456-535.

Giovampaola, et al., "Digital metamaterials", Nature Materials, vol. 13, 2014, pp. 1115-1121.

Greenleaf et al., "Anisotropic conductivities that cannot be detected by EIT," Physiol. Meas., vol. 24, 2003, pp. 413-419.

Greenleaf et al., "Full-Wave Invisibility of Active Devices at All Frequencies," Commun. Math. Phys., vol. 275, 2007, pp. 749-789.

Greenleaf et al., "Isotropic transformation optics: approximate acoustic and quantum cloaking," New Journal of Physics, vol. 10, 2008, 28 pages.

Hamilton, et al., "Generalized refraction using lenslet arrays", J. Optics A: Pure Appl. Opt., vol. 11, 2009, 12 pages.

Hashemi et al., "Diameter-bandwidth product limitation of isolated-object cloaking," Physical Review A, vol. 36, 2012, p. 013804-1-013804-8.

(56) References Cited

OTHER PUBLICATIONS

Howell, "Amplitude-only, passive, broadband, optical spatial cloaking of very large objects", Applied Optics, vol. 53, No. 9, Mar. 2014, pp. 1958-1963.
Kildishev et al., "Transformation optics: approaching broadband electromagnetic cloaking," New Journal of Physics, vol. 10, 2008, 115029, 13 pages.
Kim et al., Three-dimensional volumetric display in rubidium vapor, SPIE, vol. 2650, Mar. 1996, pp. 274-284.
Landy, et al., Nature Materials, "A full-parameter unidirectional metamaterial cloak for microwaves", Nature Materials, vol. 12, Jan. 2013, pp. 25-28.
Leonhardt, "Optical Conformal Mapping", Science, New Series, vol. 312, No. 5781,2006, pp. 1777-1780.
Leonhardt et al., Broadband Invisibility by Non-Euclidean Cloaking, Science, vol. 323, Jan. 2009, pp. 110-112.
Li et al., "Hiding under the Carpet: A New Strategy for Cloaking" Physical Review Letters, vol. 101, 2008, pp. 203901-1-203901-4.
Lippmann, "La Photographie Integrale, Comptes-Rendus", Academic Science, 1908, vol. 146, pp. 446-451.
Lippmann, "Integral Photography", Scientific American, Aug. 19, 1911, p. 164.
Liu, et al., Three-dimensional photonic metamaterials at optical frequencies, Nature Materials, vol. 7, Jan. 2008, p. 31-37.
Liu, et al., "Broadband Ground-Plane Cloak", Science, vol. 323, 2009, p. 366-369.
Lukens, et al. "A temporal cloak at telecommunication data rate", Nature, vol. 498, Jun. 2013, pp. 205-208.
Ma, et al., "Experiments on Active Cloaking and Illusion for Laplace Equation," Physical Review Letters, vol. 111, Oct. 2013, pp. 173901-1-173901-5.
McCall, "Transformation optics and cloaking", Contemporary Physics, vol. 54, No. 6, 2013, pp. 273-286.
Miller, "On perfect cloaking," Optics Express, vol. 14, No. 25, 2006, pp. 12457-12466.
Monticone et al., "Physical bounds on electromagnetic invisibility and the potential of superconducting cloaks," Photonics and Nanostructures, vol. 12, 2014, pp. 330-339.
Monticone et al., "Do Cloaked Objects Really Scatter Less?" Physical Review X, vol. 3, 2013, pp. 041005-1-041005-10.
Nachman, "Reconstructions from boundary measurements", Annals of Mathematics, vol. 128, 1988, pp. 531-576.
Nielsen, The Digital Chameleon Principle: Computing Invisibility by Rendering Transparency, Graphically Speaking, IEEE Computer Graphics and Applications, vol. 1, No. 1, 2007, pp. 90-96.
Oxburgh, et al., "Transformation optics with windows", Proc. of SPIE, vol. 9193, 2014, p. 91931E-191931E-9.
PCT/EP2009/004697, International Preliminary Report on Patentability, dated Jan. 27, 2011, 6 pages.
PCT/EP2009/004697, International Search Report and Written Opinion, dated Oct. 27, 2009, 6 pages.
PCT/US2016/028665, International Preliminary Report on Patentability, dated Nov. 2, 2017, 8 pages.
PCT/US2016/028665, International Search Report and Written Opinion, dated Jan. 27, 2017, 12 pages.
PCT/US2016/030542, International Preliminary Report on Patentability, dated Nov. 16, 2017, 12 pages.
PCT/US2016/030542, International Search Report and Written Opinion, dated Dec. 5, 2016, 15 pages.
PCT/US2016/030542, Invitation to Pay Add'l Fees and Partial Search Report, dated Sep. 6, 2016, 5 pages.
PCT/US2016/052738, International Preliminary Report on Patentability, dated Apr. 5, 2018, 11 pages.
PCT/US2016/052738, International Search Report and Written Opinion, dated Jan. 31, 2017, 17 pages.
PCT/US2016/052738, Invitation to Pay Add'l Fees and Partial Search Report, dated Dec. 6, 2016, 5 pages.
PCT/US2017/045452, International Search Report and Written Opinion, dated Oct. 16, 2017, 12 pages.
PCT/US2017/052972, International Search Report and Written Opinion, dated Dec. 7, 2017, 19 pages.
Pendry et al., "Controlling Electromagnetic Fields" Science, vol. 312, 2006, pp. 1780-1782.
Platt, et al., "History and Principles of Shack-Hartmann Wavefront Sensing", Journal of Refractive Surgery, vol. 17, 2001, pp. S573-S577.
Schittny et al., "Invisibility cloaking in a diffusive light scattering medium", Science, vol. 345, 2014, 4 pages.
Schurig, et al., "Metamaterial Electromagnetic Cloak at Microwave Frequencies", Science, vol. 314, 2006, 8 pages.
Shelby et al., "Experimental Verification of a Negative Index of Refraction," Science, vol. 292, 2001, pp. 77-79.
Silveirinha, "Anomalous Refraction of Light Colors by a Metamaterial Prism," Physical Review Letters, vol. 102, 2009, p. 193903-1-193903-4.
Smolyaninov, et al., "Two-dimensional metamaterial structure exhibiting reduced visibility at 500 nm", Optics Letters, vol. 33, No. 12, 2008, p. 1342-1344.
Smolyaninov, et al., "Anisotropic Metamaterials Emulated by Tapered Waveguides: Application to Optical Cloaking", Phys. Rev. Lett., 2009, vol. 102, p. 213901, URL http://link.aps.org/doi/10.1103/PhysRevLett.102.213901.
Soukoulis et al., Past Achievements and Future Challenges in 3D Photonic Metamaterials, Nature Photonics, vol. 5, Jul. 2011, 18 pages.
Soukoulis et al., "Past achievements and future challenges in the development of three-dimensional photonic metamaterials," Nature Photonics, vol. 5, Sep. 2011, pp. 523-530.
Szczys, Virtual Windows that Track a Viewer's Position, http://hackaday.com/2010/04/16/virtual-windows-that-track-a-viewers-position, Apr. 16, 2010 (downloaded from internet archives Jun. 19, 2018).
Theisen et al., "Optical Properties of Gallium Implanted Silicon," Frontiers in Optics/Laser Science Technical Digest, Optical Society of America, 2012, 2 pages.
Valentine et al., "Three-dimensional optical metamaterial with a negative refractive index," Nature, vol. 455, Sep. 2008, pp. 376-379.
Valentine et al., "An optical cloak made of dielectrics", Nature Materials, vol. 8, Jul. 2009, pp. 568-571.
Vasquez, et al., "Active Exterior Cloaking", Physical Review Letters, vol. 103, 2009, 4 pages.
Veselago, "The Electrodynamics of Substances with Simultaneously Negative Values of Sigma and Mu," Soviet Physics USP EKI-11, vol. 10, No. 4, 1968, pp. 509-514.
Wolf et al., "Invisible bodies and uniqueness of the inverse scattering problem," Journal of Modern Optics, vol. 40, No. 5, 1993, pp. 785-792.
Xiao, et al., "Advances in three-dimensional integral imaging: sensing, display, and applications", Applied Optics, vol. 52, No. 4, Feb. 2013, pp. 546-560.
Zhai, et al., "An effective broadband optical 'cloak' without metamaterials", Laser Physics Letters, vol. 10, No. 6, 2013, 066002 (5 pages).
Zhang et al., "Macroscopic Invisibility Cloak for Visible Light", Physical Review Letters, vol. 106, 2011, pp. 033901-1-033901-4.
U.S. Appl. No. 15/571,514, Non-Final Office Action dated May 17, 2019, 18 pages.
U.S. Appl. No. 15/567,805, Non-Final Office Action dated Jan. 11, 2019, 36 pages.
International Application No. PCT/US2017/045452, International Preliminary Report on Patentability dated Feb. 14, 2019, 7 pages.

* cited by examiner

3D DISPLAY RAY PRINCIPLES AND METHODS, ZOOMING, AND REAL-TIME DEMONSTRATION

CROSS-REFERENCE TO RELATED APPLICATIONS

This patent application claims the benefit of U.S. Provisional Application No. 62/378,016, filed Aug. 22, 2016, the subject matter of which is incorporated in its entirety by this reference.

BACKGROUND OF THE DISCLOSURE

Three-dimensional displays have been proposed for a number of applications, however still further improvements in three-dimension displays and their use may be had.

SUMMARY OF THE DISCLOSURE

The present disclosure is generally related to three-dimensional displays and methods for displaying three-dimensional images. Some embodiments may be related to zooming for 3D image capture and display in real-time.

In some aspects, a method of projecting a first three-dimensional image for viewing from a first reference point may be provided. The method may include capturing, at a first input, first input rays associated with an object. Each captured first input ray may have an associated position and angle at the first input. The method may further include determining, based on the positions and angles of the captured first input rays, first propagated output ray positions and angles for output at an output that is spaced a first distance from the first input. The first propagated output ray positions and angles may be propagated a non-zero propagation distance relative to the captured first input rays that is different from the first distance. The first propagated output rays may be outputted at the output to produce the first three-dimensional image of the object that appears, from the first reference point, to be shifted a second distance equal to the first distance minus the non-zero propagation distance.

In some embodiments, the non-zero propagation distance may be less than zero. The first propagated output rays may be outputted to produce a zoomed-in three-dimensional image of the object when viewed from the first reference point.

In some embodiments, the non-zero propagation distance may be greater than zero. The first propagated output rays may be outputted to produce a zoomed-out three-dimensional image of the object when viewed from the first reference point.

Optionally, first propagated output ray positions and angles may be determined by tracing first input rays backward to a faux input positioned the non-zero propagation distance from the first input in a direction of an object space.

In some embodiments, first propagated output ray positions and angles may be determined by tracing first input rays forward to a faux input positioned the non-zero propagation distance from the first input in a direction of an image space.

In certain embodiments, an array of image capture devices define the first input. The array of image capture devices may be further coupled with an inlet lenslet array.

Optionally, an array of display elements may be coupled with a lenslet array to define the output.

The method may further include projecting a second three-dimensional image for viewing from a second reference point at a different angle from the output than the first reference point by capturing, at a second input, second input rays associated with the object. Each captured second input ray may have an associated position and angle at the second input. The method may further include determining, based on the positions and angles of the captured second input rays, second propagated output ray positions and angles for output at the output that is spaced a third distance from the second input. The second propagated output ray positions and angles may be propagated a second non-zero propagation distance relative to the second captured input rays that is different from the third distance. The second propagated output rays may be outputted concurrently with outputting the first propagated output rays at the output to produce the second three-dimensional image of the object that appears, from the second reference point, to be shifted a fourth distance equal to the third distance minus the second non-zero propagation distance.

The method may further include capturing, at the first input, second input rays associated with the object after the object moved relative to the first input. Each captured second input ray may have an associated position and angle at the first input. Thereafter, the method may include redetermining, based on the positions and angles of the captured second input rays, second propagated output ray positions and angles for output at the output. The second propagated output ray positions and angles may be propagated the non-zero propagation distance relative to the captured second input rays. The second propagated output rays may be outputted at the output to produce an updated three-dimensional image of the object that appears, from the first reference point, to be shifted the second distance equal to the first distance minus the non-zero propagation distance.

In further aspects, a method of projecting a three-dimensional image for viewing from a reference point may be provided. The method may include receiving input rays associated with an object. Each received input ray may have a position and angle associated with an input. The method may further include determining, based on the positions and angles of the received input rays, a series of propagated output ray positions and angles for output at an output. The series of propagated output ray positions and angles may be propagated with increasing or decreasing propagation distance increments relative to the received input rays. The series of propagated output rays may be output at the output to produce the three-dimensional image of the object that appears, from the reference point, to be moved toward or away from the reference point.

In some embodiments, the series of propagated output ray positions and angles may be determined with increasing propagation distances relative to the received input rays. The series of propagated output rays may be outputted at the output to produce the three-dimensional image of the object that appears, from the reference point, to be moved away from the reference point.

In some embodiments, the series of propagated output ray positions and angles may be determined with decreasing propagation distances relative to the received input rays. The series of propagated output rays may be outputted at the output to produce the three-dimensional image of the object that appears, from the reference point, to be moved toward the reference point.

Optionally, the method may include capturing the input rays associated with the object at the input. An array of image capture devices may define the input in certain embodiments.

In still further aspects, a three-dimensional display may be provided that includes a processor coupled with a display. The processor may be configured to: (1) receive input rays associated with an object, each received input ray having a position and angle associated with an input; (2) determine, based on the positions and angles of the received input rays, a series of propagated output ray positions and angles for output at the display, the series of propagated output ray positions and angles being propagated with increasing or decreasing propagation distance increments relative to the received input rays; and (3) outputting the series of propagated output rays at the display to produce the three-dimensional image of the object that appears, from the reference point, to be moved toward or away from the reference point.

The processor may be configured to determine the series of propagated output ray positions and angles with increasing propagation distances relative to the received input rays. The series of propagated output rays may be outputted at the display to produce the three-dimensional image of the object that appears, from the reference point, to be moved away from the reference point.

The processor may be configured to determine the series of propagated output ray positions and angles with decreasing propagation distances relative to the received input rays. The series of propagated output rays may be outputted at the display to produce the three-dimensional image of the object that appears, from the reference point, to be moved toward the reference point.

The three-dimensional display may include an input for capturing the input rays associated with the object. An array of image capture devices may define the input.

In still further aspects, a method of displaying an image may be provided that includes collecting input rays at an input plane. The collected input rays may include a first set of rays associated with a first portion of a target object and a second set of rays associated with a second object disposed between the target object and the input plane. The second object may be obstructing rays from a second portion of the target object from the input plane. The method may include determining a position of the second object by back-tracing collected input rays received at the input plane. The first set of rays may be differentiated from the second set of rays based on the position of the second object determined by back-tracing the collected input rays received at the input plane. The second portion of the target object may be reconstructed by estimating a third set of rays associated with the second portion of the target object based on the first set of rays differentiated from the second set of rays and associated with the first portion of the target object. Thereafter, an image of the first portion of the target object and the reconstructed second portion of the object may be outputted at an output (e.g., a display or the like). Embodiments of the present disclosure may further include a system, with appropriate hardware and/or software (e.g., processors, detectors, lenslet arrays, displays, etc.), for carrying out the method generally described above.

In some embodiments, the input plane may include a lenslet array with a plurality of detectors.

Optionally, determining the position of the second object by back-tracing collected input rays received at the input plane may include determining a boundary of the second object.

In some embodiments, determining the position of the second object by back-tracing collected input rays received at the input plane may include determining a contour of the second object.

In some embodiments, determining the position of the second object by back-tracing collected input rays received at the input plane may include differentiating the second object from the target object based on a change in contrast.

In some embodiments, determining the position of the second object by back-tracing collected input rays received at the input plane may include differentiating the second object from the target object based on a change in color.

Optionally, the method may include determining a position of the first object by back-tracing collected input rays received at the input plane.

The image of the first portion of the target object and the reconstructed second portion of the object may be outputted by outputting the image without an image of the second object.

Reconstructing the second portion of the target object may include estimating a position and direction of rays that would be collected at the input plane but for the obstruction by the second object.

The second portion of the target object may be reconstructed based on a color or a shape of the first portion of the target object.

Embodiments of the disclosure covered by this patent are defined by the claims below, not this summary. This summary is a high-level overview of various aspects of the disclosure and introduces some concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The disclosure will be better understood upon reading the following description and examining the figures which accompany it. These figures are provided by way of illustration only and are in no way limiting on the disclosure.

BRIEF DESCRIPTION OF THE DRAWINGS

Further details, aspects, and embodiments of the disclosure will be described by way of example only and with reference to the drawings. In the drawings, like reference numbers may be used to identify like or functionally similar elements. Elements in the figures may be illustrated for simplicity and clarity and have not necessarily been drawn to scale.

DETAILED DESCRIPTION OF THE DISCLOSURE

3D Display Ray Principles

Some optical principles for three-dimensional (3D) image capture and display are discussed first. These can be implemented using various technologies, including digital technology, whether in real-time or not. For simplicity, it is assumed that the magnification is unity, though this and other effects can be added for various visual effects for the final image(s).

Figure 1:
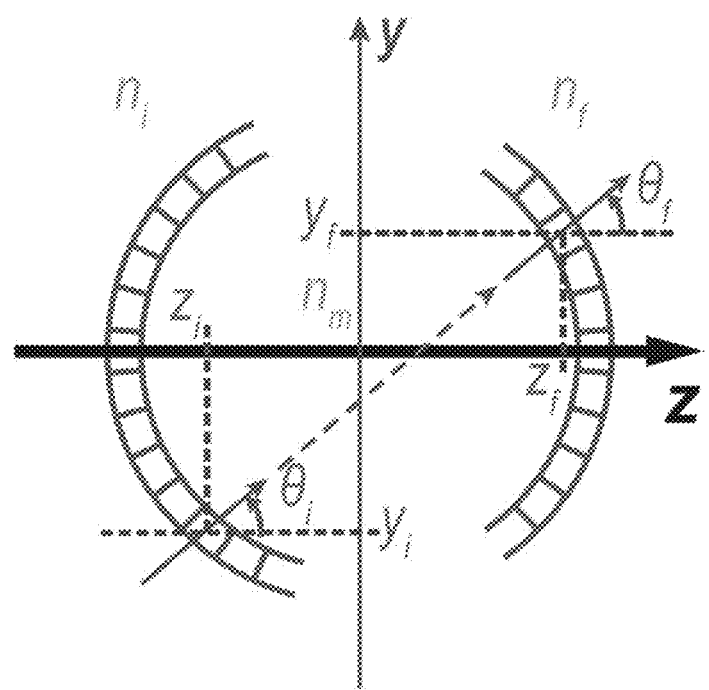
FIG. 1 shows coordinates for rays for shapes that have non-planar input and output surfaces.

FIG. 1 shows coordinates for rays for shapes that have non-planar input and output surfaces. The propagation of an input ray at $y=y_i$, $z=z_i$ with angle $\theta_i$, to output ray at $y=y_f$, $z=z_f$ with angle $\theta_f$.

$$\begin{bmatrix} y_f \\ n_f \tan\theta_f \end{bmatrix}_{z=z_f} = \begin{bmatrix} 1 & L/n_m \\ 0 & 1 \end{bmatrix} \begin{bmatrix} y_i \\ n_i \tan\theta_i \end{bmatrix}_{z=z_i} = \begin{bmatrix} 1 & (z_f - z_i)/n_m \\ 0 & 1 \end{bmatrix} \begin{bmatrix} y_i \\ n_i \tan\theta_i \end{bmatrix}_{z=z_i} \quad (1)$$

Here $n_i$, $n_m$, $n_f$ are the indices of refraction, before the input surface, between the input and output, and after the output surface, respectively. L is the propagation distance, for the specific ray that was propagated. For arbitrarily shaped input and output surfaces, Equation (1) can be applied for each plane containing and rotated about z.

For simplicity, it may be assumed that $n_i=n_m=n_f=1$ and that each input and output surface are two-dimensional (2D) planes perpendicular to the z-axis, though the formalism is not limited to these cases. Some, if not most, three-dimensional (3D) displays that do not change the appearance of objects, can be described as an output of rays that have propagated through space, hence by Equation (1).

Figure 2A:
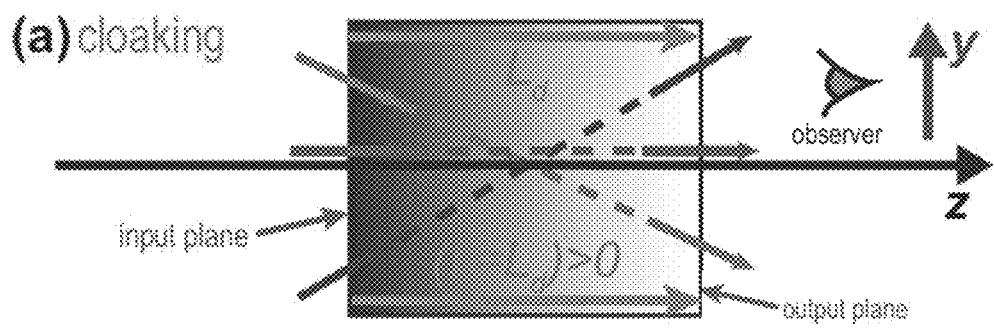
FIG. 2A shows optical principles for 3D display for cloaking display, according to some embodiments of the disclosure.
Figure 2B:
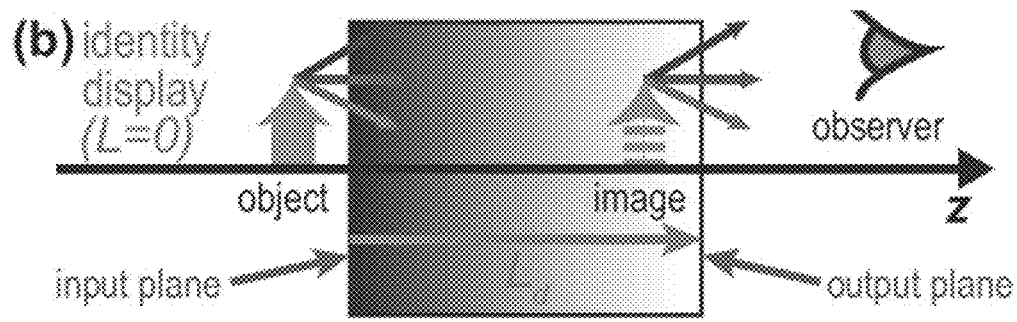
FIG. 2B shows optical principles for 3D display for identity display, according to some embodiments of the disclosure.
Figure 2C:
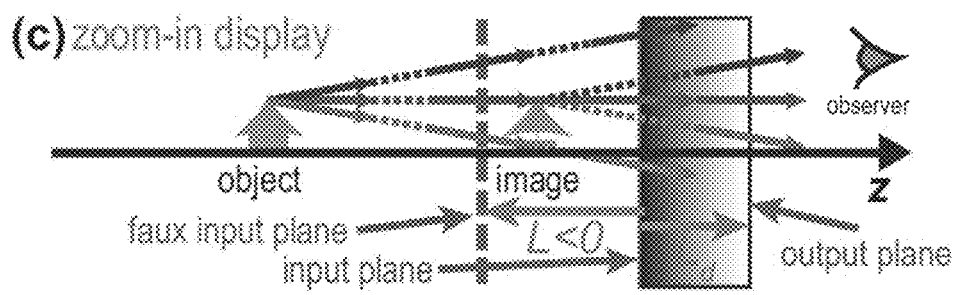
FIG. 2C shows optical principles for 3D display for a zoom-in display, according to some embodiments of the disclosure.
Figure 2D:
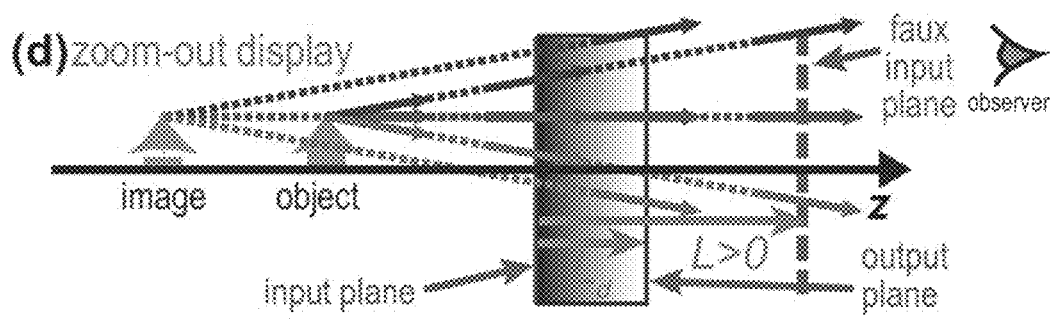
FIG. 2D shows optical principles for 3D display for a zoom-out display, according to some embodiments of the present disclosure.

FIGS. 2A-2D show examples of rays for different scenarios. In particular, FIG. 2A shows optical principles for 3D display for cloaking display, according to some embodiments of the disclosure. FIG. 2B shows optical principles for 3D display for identity display, according to some embodiments of the disclosure. FIG. 2C shows optical principles for 3D display for a zoom-in display, according to some embodiments of the disclosure. FIG. 2D shows optical principles for 3D display for a zoom-out display, according to some embodiments of the present disclosure.

The device length ($L_d$) is defined to be the distance from the input plane to the output plane. L is the propagation distance, or rather an "effective" propagation distance when it is different from $L_d$. When the two are the same, then the system describes a cloaking system, as illustrated in FIG. 2A. When L=0, as shown in FIG. 2B, the image is displaced from the object by a distance $L_d$ and the system may describe an identity display. For an identity transform, rays may be simply copied from input plane to output plane. This may result in the image being shifted by $L_d$ from the object in absolute position in z. The distance between the object and the input plane is the same as that between the image seen by the observer and the screen. The absolute distances are irrelevant for an observer that is viewing the display through a television or a movie screen. For such situations, it is as if the screen is placed where the input plane was located, so the object appears as close/far to the screen as to the image capture plane.

FIG. 2C and FIG. 2D describe the cases where $L \neq 0$. When $L<0$ for Equation (1), rays are traced backwards as if the image capture device (input plane) was placed a distance $|L|$ in the direction of the object space (at the "faux" input plane in FIG. 2C). This is how an image of the object may be zoomed-in for 3D displays. The absolute position (in z) of the image is shifted by $L_d-L$ from the object position. For a viewer/observer, this may be as if the camera (or image capture/input plane) was placed $|L|$ towards the object, at the "faux input plane," instead of its original position.

When $L>0$ for Equation (1), rays may be traced forward as if the image capture device (input plane) was placed at a distance $|L|$ in the direction of the observer (image space) (at the "faux" input plane in FIG. 2D). The rays may be traced forward and then output. This may give the effect of a zoomed-out image of the object for 3D displays. The absolute position (in z) of the image is shifted by $(L_d-L)$ from the object position, similar to the case for $L<0$. For a viewer/observer, this may be as if the camera (or image capture/input plane) was placed $|L|$ away from the object, at the "faux input plane," instead of its original position. It should be understood that L and $L_d$ may be less than or equal to zero in some embodiments, or may be greater than or equal to zero in other embodiments.

Accordingly, in some embodiments of the invention, a three-dimensional display may be provided to project a zoomed-in or zoomed-out image of the object associated with the input rays. In some embodiments, the display may provide a first image of the object and may thereafter output a series of images that transitions the first image of the object toward a more zoomed-in or more zoomed-out image of the object. Optionally, the first image of the object may be a zoomed-in or zoomed-out image of the object. In some embodiments, the first image of the object may be an identity transform of the input rays associated with the object.

In some embodiments, the display may be a real-time display where the output is recalculated by changes in the input. In certain embodiments, display may not be real-time and the input rays associated with the object may be prerecorded and transmitted to or accessed by the display when output of an image of the object is desired.

3D Display Implementations

Physically realizing the 3D ray propagation principles laid out can be done by using an array of image capture devices/detectors for the input plane and an array of display elements for the output plane. For example, an array of cameras on a 2D plane can be used for the input plane, and the output can be a combination of display screen and lenticular lenslet arrays or fly's eye lenslet arrays. Equation (1) may be used to determine the proper ray propagation between these two input and output planes, or even for arbitrarily shaped input and output surfaces. By adjusting L, recalculating, and reprocessing the output using Equation (1), the object(s) can appear to be moved along the longitudinal direction z, provided enough information was captured by the original input plane.

The detectors may be connected to receive images in real-time, and process them quickly with a computer/processor, to output on the display with delays that are not noticeable. One method to do this could be to connect internet protocol cameras, and connect them through routers and switches, or use some other methods to connect the detectors. Then, one or more camera(s)/detector(s) may be accessed at a time to process the image(s), thus requiring less bandwidth for the connections and less computational power than simultaneously accessing all cameras/detectors.

In some real-time embodiments, the input plane may be associated a first device and the output plane may be associated with a second device that is different from the first device that is communicatively coupled with the first device (e.g., tethered, wireless, etc.). The first and second devices may be mobile phones, tablets, laptops, or the like. Optionally, the first device may act as the input plane for the display on the second device and the second device may act as the input plane for display on the first device. Alternatively, one device may be a portable electronic device that receives the input rays associated with an object, and the other may be a stand-alone display that is configured to calculate the series of propagated output ray positions and angles for output at the display. The propagated output ray positions and angles may be propagated with increasing or decreasing propagation distance increments relative to the received input rays.

Figure 3:
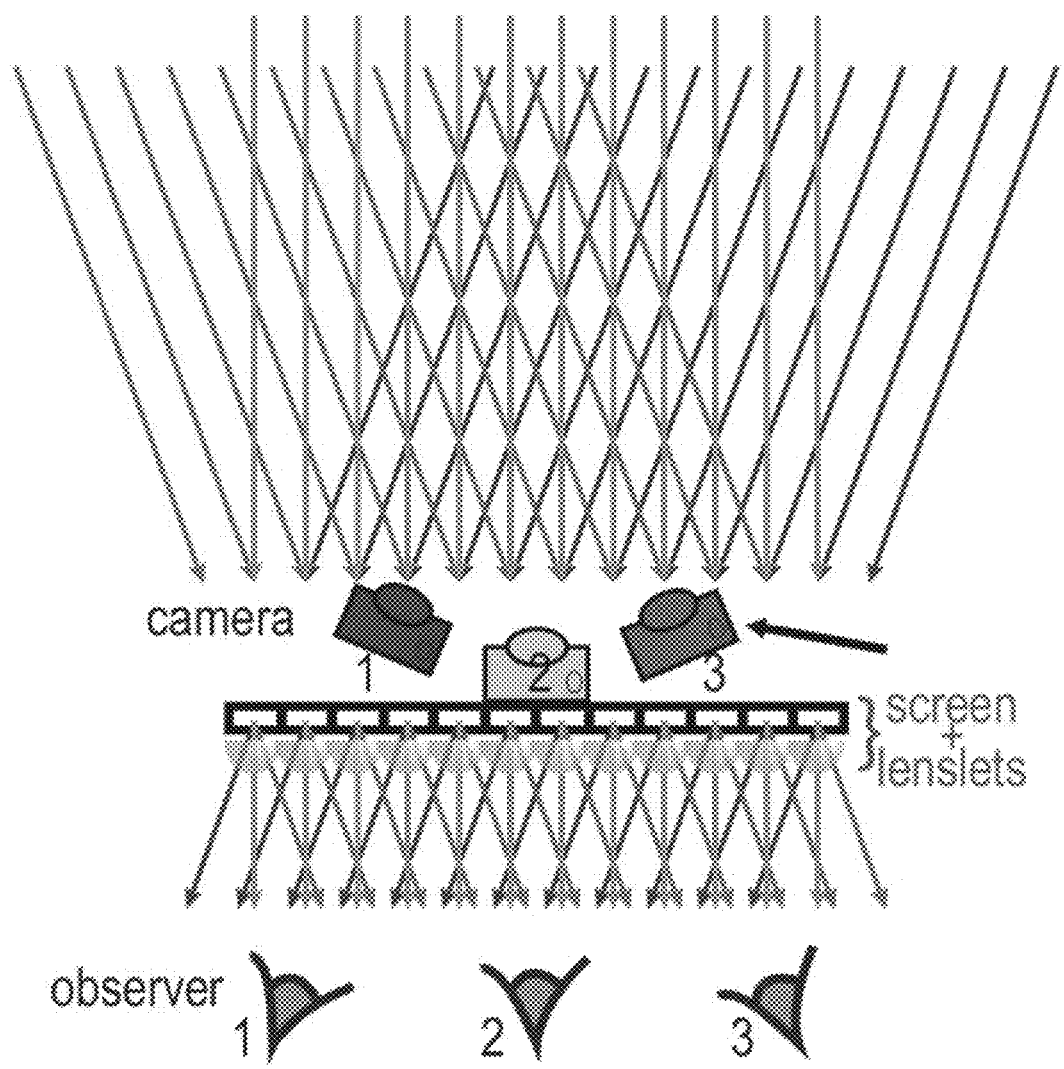
FIG. 3 shows an approximated 3D display according to some embodiments.

While embodiments described herein are generally discussed for real-time capture and output for three-dimensional displays, it should be understood that in some embodiments non-real-time three-dimensional display may be performed. For example, the input rays may be associated with an object may be stored on a computer readable media. A processor may access or otherwise receive the input rays from the computer readable media and may process the input rays to calculate the series of propagated output ray positions and angles for output at the display A simplified method to capture images for 3D is shown in FIG. 3. FIG. 3 shows an approximated 3D display according to some embodiments. For a system that has discrete angles that can be shown (views), cameras may be used that match the views in number. FIG. 3, for example, shows a system with three views, where three cameras can be placed to capture input rays at appropriate angels and positions. One camera will be used for one observer viewpoint only, and displayed on the output (screen+lenslet array). For example, images from cameras 1, 2, and 3, will be used only for observers 1, 2, and 3, respectively. The image processing and display can then be matched for the same number of observer positions as the number of views. For observers that are far away from the screen, each observer position should correspond to approximately one "view." For such cases, each camera image can then be mapped to just one view, simplifying the process. For observers that are close to the display, and if more views are available for the 3D display system, then more sophisticated mapping can be done that is closer to that given by Equation (1). In some embodiments, the input, output, and processing components described in related PCT patent application PCT/US2016/028665, the contents of which are incorporated herein in its entirety, may be used with embodiments described herein.

3D Display Beyond Opaque Objects

Figure 4:
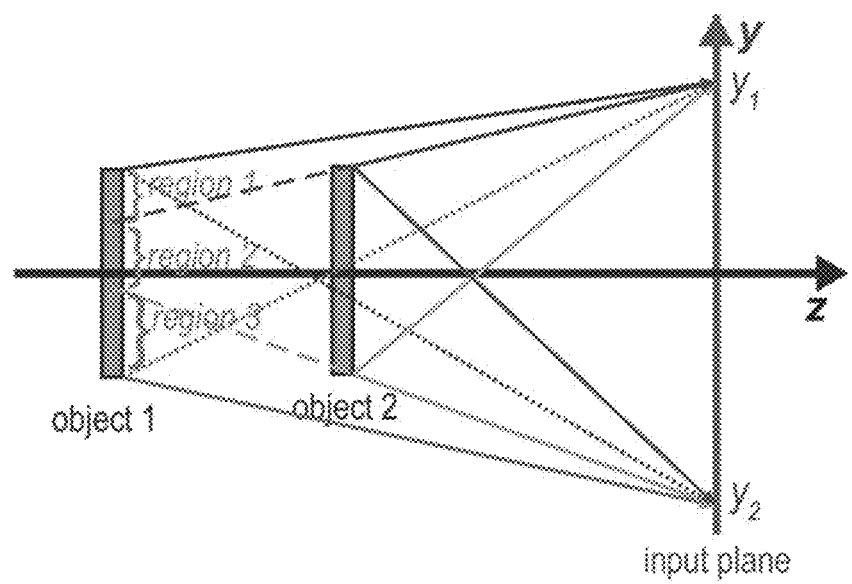
FIG. 4 shows an obstructed views diagram according to some embodiments.

Here a method to "see through" opaque objects or simulate such viewing is described. Suppose rays are collected at the input plane and the rays are propagated backward (L<0 in Equation (1)) beyond an opaque object. FIG. 4 shows a diagram of two objects as seen from the input plane. Rotational symmetry is assumed for simplicity; however, the method can be generalized to general 3D structures. Both objects may be opaque, and scatter or emit light rays toward the input plane. Let's suppose that we only place cameras/detectors on the input plane between $y=y_1$ and $y=y_2$. This leads to object 2 obstructing the complete view of object 1. Only rays in region 1 from object 1 can be captured on the input plane at $y=y_1$. Rays in region 3 from object 1 can be captured on the input plane at $y=y_2$. However, not all the rays from regions 1 or 2 are captured by the input plane, such as the dotted ray angles among others. Region 2 is completely occluded from the input system due to object 2, for cameras between $y=y_1$ and $y=y_2$. To "see-through" object 2 and view object 1, all the necessary rays from regions 1, 2, and 3 must be calculated, simulated, or recreated. There may be commercially available solutions for doing that, or algorithms to compute such. Once the rays are reconstructed, Equation (1) can be applied as if object 2 is not present, by removing rays from object 2 and using rays from object 1. This will give the effect of "seeing through" object 2.

We suggest an example method for reconstructing object 1 rays. First, we must determine the z position of object 2, which can be done by back-tracing the rays that arrive at the input plane. For example, the two rays in FIG. 4 from the top edge of object 2 arrive at y and $y=y_2$ on the input plane. To determine which rays are from the top edge of object 2, we can use changes in contrast, color, texture, and boundaries, among other characteristics. We assume the input plane is able to determine the angles of the rays, which is the case when lenslet arrays are used with the detectors. With the angles of the 2 rays, and the (y; z) positions of the input plane, we can then determine the (y; z) position of the top edge of object 2, by finding where the 2 rays intersect. Similarly, we can determine the contour and shape of object 2 if it is not a flat object. Similarly, two rays from the top edge of object 1 can be used to determine or estimate the (y; z) position of that point on object 1. Continuing this method, the contour and shape of object 1 for regions 1 and 3 can be obtained. For region 2, interpolation, estimation, or duplication of surrounding can be applied to guess what object 1 looks like in this region. With object 1 reconstructed, knowledge of the position (y; z) for each point on it can be used to generate rays (amplitude, color, angle, etc.) for the input plane. Since we now know the directions and positions of rays that should come from object 1 to the input plane, we can use these rays to now zoom in or out, including zooming past object 2 toward object 1. This is similar to a 3D game where a player might "walk through" an object and see behind it. This may be done by using Equation (1) by inverting it so as to backtrace the rays from object 1 on the input plane, to go past/behind object 2.

One or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including but not limited to application-specific circuits. Combinations of computer-executed software and hard-wired logic or other circuitry may be suitable as well.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. Additionally or alternatively, the computing device(s) may comprise circuitry that renders the device(s) operative to implement one or more of the methods of the present subject matter.

Any suitable computer-readable medium or media may be used to implement or practice the presently-disclosed subject matter, including but not limited to, diskettes, drives, and other magnetic-based storage media, optical storage media, including disks (e.g., CD-ROMS, DVD-ROMS, variants thereof, etc.), flash, RAM, ROM, and other memory devices, and the like.

The subject matter of embodiments of the present invention is described here with specificity, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A method of projecting a first three-dimensional image for viewing from a first reference point, the method comprising:
    capturing, at a first input, first input rays associated with an object, each captured first input ray having an associated position and angle at the first input;
    determining, based on the captured first input rays, first propagated output ray positions and angles for output at an output that is spaced a first distance from the first input, the first propagated output ray positions and angles being propagated a non-zero propagation distance relative to the captured first input rays that is different from the first distance;
    outputting the first propagated output rays at the output to produce the first three-dimensional image of the object that appears, from the first reference point, to be shifted a second distance equal to the first distance minus the non-zero propagation distance.

2. The method of claim 1, wherein the non-zero propagation distance is less than zero and wherein the first propagated output rays are outputted to produce a zoomed-in three-dimensional image of the object when viewed from the first reference point.

3. The method of claim 1, wherein the non-zero propagation distance is greater than zero and wherein the first propagated output rays are outputted to produce a zoomed-out three-dimensional image of the object when viewed from the first reference point.

4. The method of claim 1, wherein determining first propagated output ray positions and angles comprises tracing first input rays backward to a faux input positioned at the non-zero propagation distance from the first input in a direction of an object space.

5. The method of claim 1, wherein determining first propagated output ray positions and angles comprises tracing first input rays forward to a faux input positioned at the non-zero propagation distance from the first input in a direction of an image space.

6. The method of claim 1, wherein an array of image capture devices defines the first input.

7. The method of claim 6, wherein the array of image capture devices is further coupled with an inlet lenslet array.

8. The method of claim 1, wherein an array of display elements coupled with a lenslet array define the output.

9. The method of claim 1, further comprising projecting a second three-dimensional image for viewing from a second reference point at a different angle from the output than the first reference point by:
    capturing, at a second input, second input rays associated with the object, each captured second input ray having an associated position and angle at the second input;
    determining, based on the captured second input rays, second propagated output ray positions and angles for output at the output that is spaced a third distance from the second input, the second propagated output ray positions and angles being propagated a second non-zero propagation distance relative to the second captured input rays that is different from the third distance;
    outputting the second propagated output rays concurrently with outputting the first propagated output rays at the output to produce the second three-dimensional image of the object that appears, from the second reference point, to be shifted a fourth distance equal to the third distance minus the second non-zero propagation distance.

10. The method of claim 1, further comprising capturing, at the first input, second input rays associated with the object after the object moved relative to the first input, each captured second input ray having an associated position and angle at the first input;
    redetermining, based on the captured second input rays, second propagated output ray positions and angles for output at the output, the second propagated output ray positions and angles being propagated the non-zero propagation distance relative to the captured second input rays;
    outputting the second propagated output rays at the output to produce an updated three-dimensional image of the object that appears, from the first reference point, to be shifted the second distance equal to the first distance minus the non-zero propagation distance.

* * * * *